United States Patent [19]

Bulle et al.

[11] 4,291,557

[45] Sep. 29, 1981

[54] TRAILER HITCH LOCK

[76] Inventors: Marshall Bulle, 918 Third St., Farmington, Minn. 55024; Dale A. Johnson, 6336 19th Ave. S., Richfield, Minn. 55423

[21] Appl. No.: 144,773

[22] Filed: Apr. 28, 1980

[51] Int. Cl.³ .............................................. B60D 1/12
[52] U.S. Cl. ......................................... 70/58; 280/507
[58] Field of Search ............. 70/57, 58, 258, 163–173; 280/507

[56] References Cited

U.S. PATENT DOCUMENTS 3,226,133  12/1965  Geresy ................................. 280/507
3,410,580  11/1968  Longenecker ....................... 280/507
3,492,023   1/1970  Thompson ........................... 280/507
3,526,110   9/1970  Foote .................................... 70/258
3,780,546  12/1973  Longenecker ......................... 70/58
3,810,664   5/1974  Nonnink .............................. 280/507

Primary Examiner—Robert L. Wolfe
Attorney, Agent, or Firm—Donald A. Jacobson

[57] ABSTRACT

An anti-theft device secured by sliding the device over a ball-connector type trailer hitch which automatically engages the hitch by means of a spring loaded bolt, to obstruct access by the ball and prevent unauthorized use of the trailer. The device is removed by retracting the bolt using only a conventional key. No tools or auxiliary parts are required to attach or remove this device.

4 Claims, 7 Drawing Figures

U.S. Patent  Sep. 29, 1981  Sheet 2 of 3  4,291,557
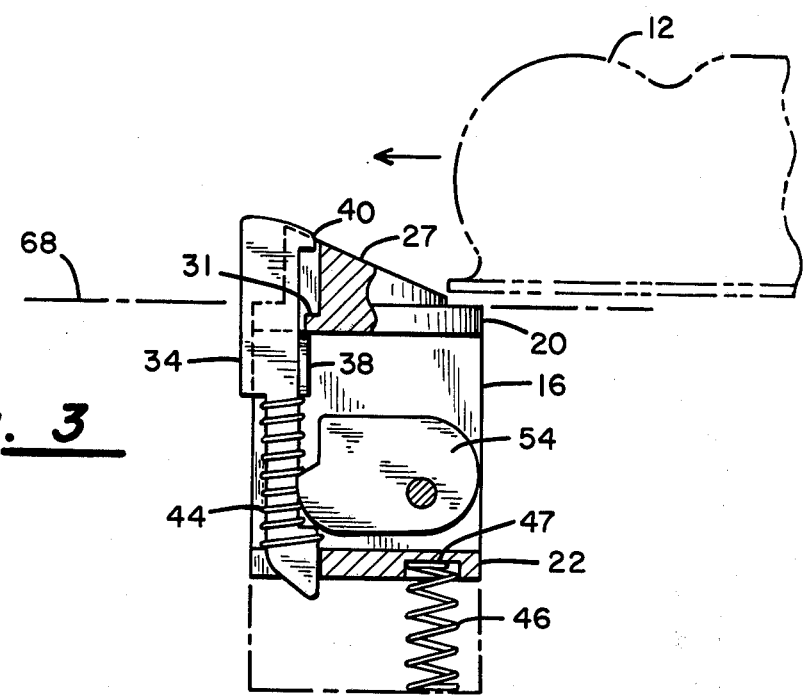
*Fig. 3*
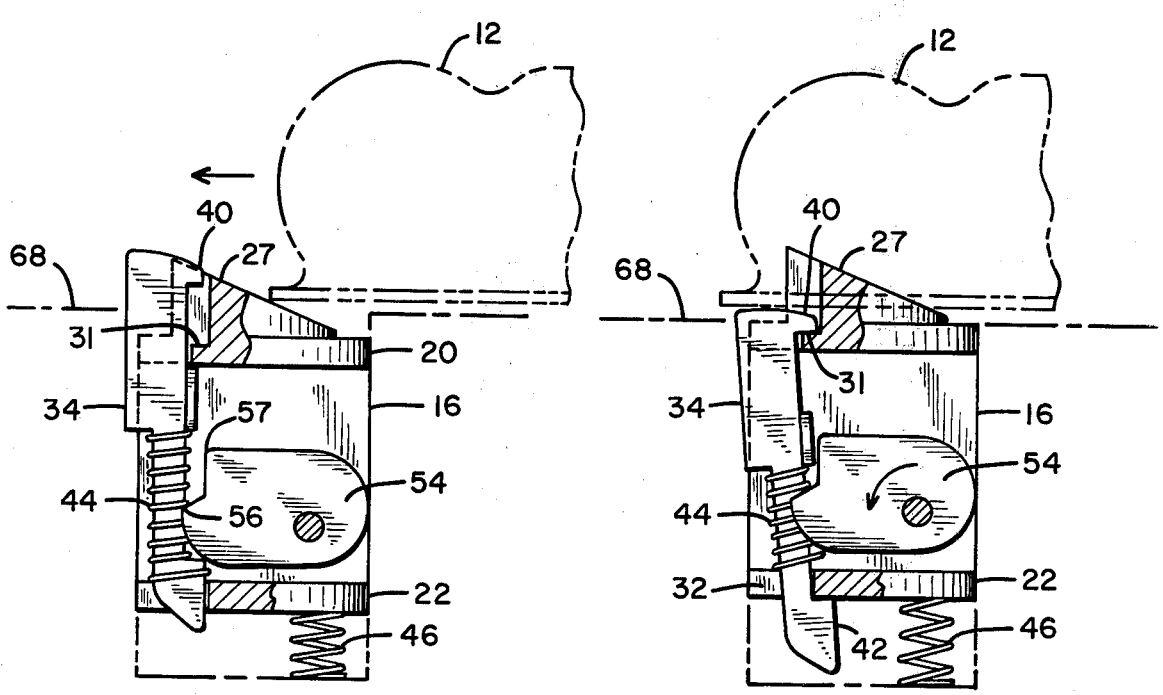
*Fig. 4*  *Fig. 5*

TRAILER HITCH LOCK

BACKGROUND OF THE INVENTION

I. Field of the Invention

This invention relates generally to locking mechanisms and relates particularly to an apparatus which covers the socket portion of a trailer hitch to deny access of the ball portion of the hitch to prevent the unauthorized movement of the trailer.

II. Description of the Prior Art

There are a number of locking arrangements for covering the socket of conventional ball and socket type trailer hitch to deny access by the trailer hitch ball and therefore to prevent the unauthorized use of the trailer. These devices generally require either plural separate adjusting or locking parts and are difficult to attach and remove in that the adjustment is usually made from the underside of the trailer hitch.

In U.S. Pat. No. 3,526,110 to Foote, a set screw is adjusted by a separate tool to attach or remove the device with an access hole for the tool opened and closed by a key. This adjustment must be made from the underside of the trailer hitch which is a particularly difficult operation during inclement weather and at night. In U.S. Pat. No. 3,780,546, Longenecker, a separate padlock is used to secure the device to the hitch after the device has been placed over the hitch. These patents are representative of the prior art in that a separate lock or tool is required.

No prior art known to me provides the combination of attributes of the present invention, namely, a locking connection of a unitary device to the hitch by sliding the device over the hitch and removal permitted by the use of a key only.

SUMMARY OF THE INVENTION

The locking device of the present invention is extremely simple and rugged. A ramp-shaped spring loaded bolt is depressed during a sliding engagement of the device to the end of a trailer hitch by the interaction of the lower edge of the trailer hitch bearing against the ramp surface on the bolt. Once the latch clears the lower edge of the hitch during the sliding attachment of the locking device to the hitch the sheer side of the bolt bears against the interior portion of the hitch to prohibit removal. With the bolt in this position within the ball receptacle the lower edge of the trailer hitch bears against the floating stop. This engages the stop with the bolt which prevents the bolt from being depressed, thus preventing the unauthorized removal of the locking device from the hitch. A key, operating a conventional lock cylinder, rotates a cam which first disengages the floating stop from the bolt and second depresses the bolt below the level of the hitch allowing the device to be removed from the hitch.

BRIEF DESCRIPTION OF THE DRAWINGS

FIGS. 3, 4, 5, 6, and 7 are partial cross-sectional views of the major operating parts of the locking device engaging the trailer hitch, shown in phantom outline, in various stages of the locking-unlocking cycle.

DESCRIPTION OF THE PREFERRED EMBODIMENT

Figure 1:
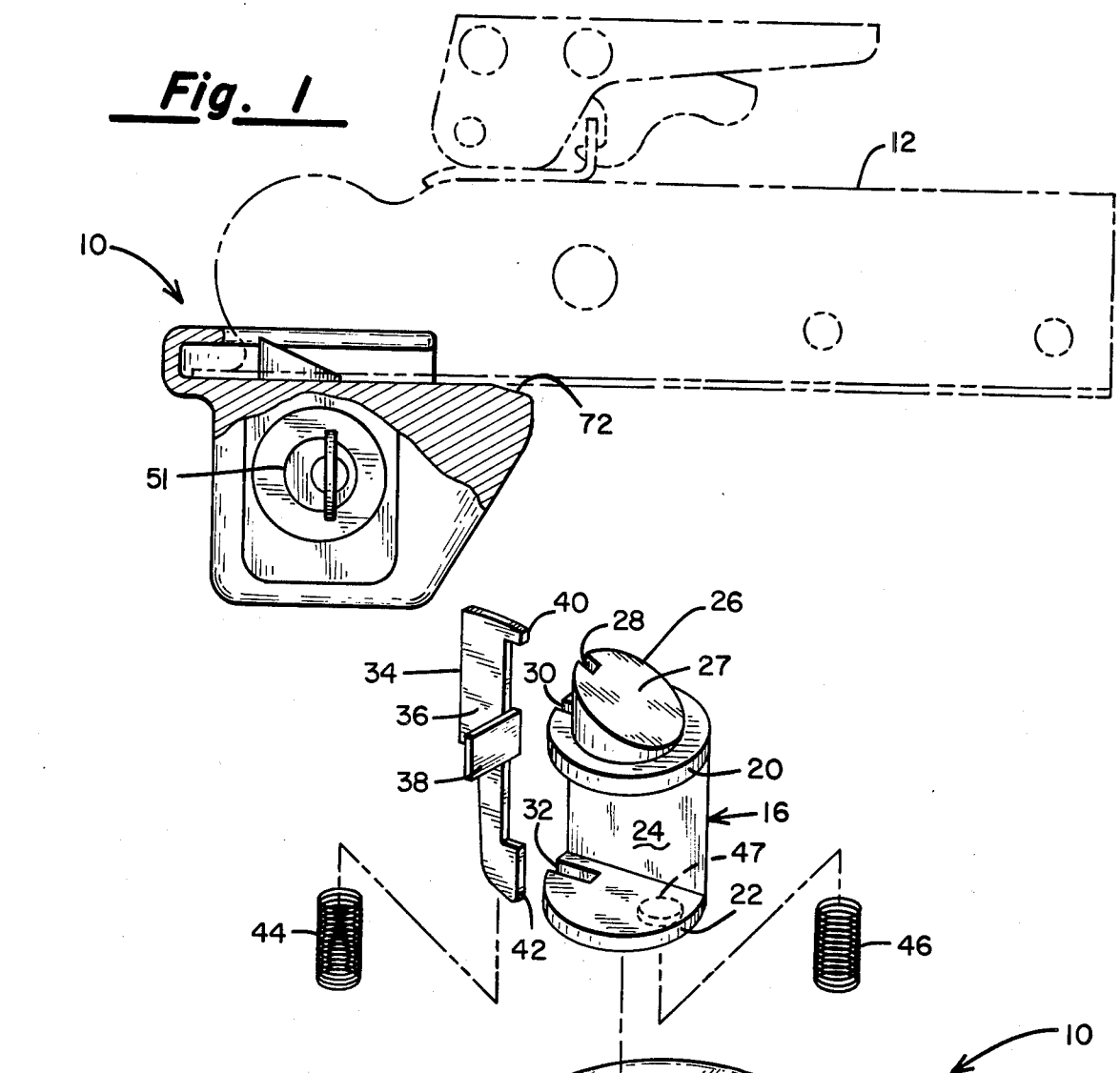
FIG. 1 is a side cross-sectional view of the invention mounted on a trailer hitch which is indicated in phantom outline.

Referring first to FIG. 1, locking device 10 is shown attached to a trailer hitch 12 which is illustrated in phantom outline. The locking device covers the bottom opening of the cavity on trailer hitch 12 which receives a ball to prevent the unauthorized use of the trailer.

Figure 2:
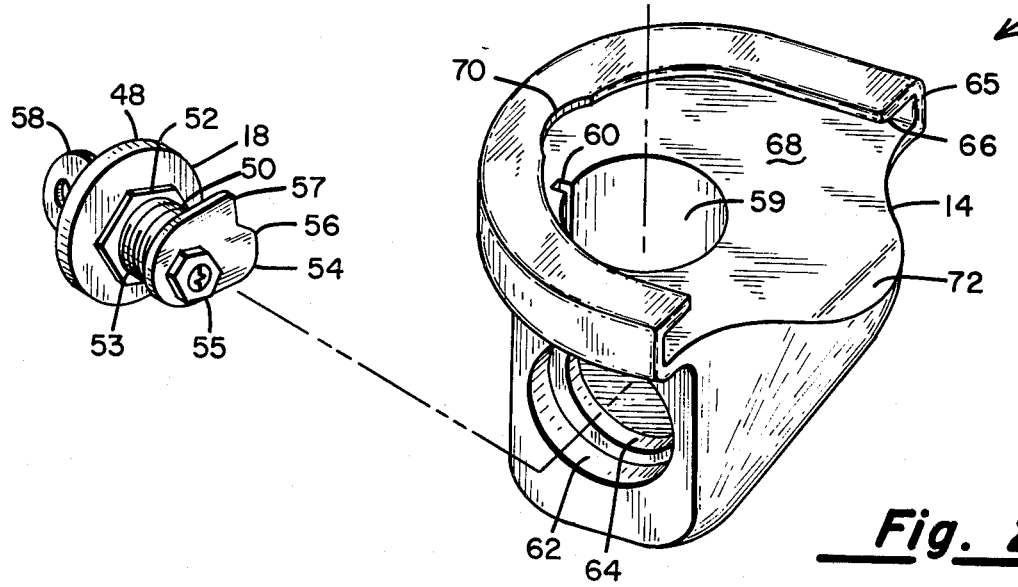
FIG. 2 is an exploded plan view of the individual parts.

Referring to FIG. 2, the operating parts of the locking device 10 can be seen. Locking device 10 consists of a cast metal body member 14 enclosing a metal cylinder 16, with operating accessories, all of which will be described in greater detail here and below, and a locking means 18. Cylinder 16 has a cut-out portion formed in the side surface thereof, forming an upper cylinder segment 20, an equal sized lower cylinder segment 22, and a connecting web 24 there between. The outer rounded surface of connecting web 24 matches the corresponding surfaces of spools 20 and 22. A ramp member in the form of a truncated cylinder 26, has a ramp top 27, formed integrally with the cylinder 20. The ramp 26, as well as the cylindrical segments 20 and 22 each have equal width vertically aligned rectangular notches 28, 30 and 32, respectively, extending from their periphery a portion of the way along their respective radii toward their centers. The inner flat surface of connecting web 24 forms a chord with the cylindrical segments 20 and 22, the chord being parallel to and offset from these notches toward the outer rounded surface a distance approximately equal to the notch widths. The depth of notches 28 and 30 are equal while notch 32 is cut slightly deeper than is notch 30. The purpose for this difference will be discussed later.

A floating stop member 34 consists of a stop body 36 with an attached stop arm 38 which projects at right angles from the body. Stop body 36 has an upper projection 40 and a lower projection 42. The purpose of these projections will be discussed later. Stop body 36 is slightly thinner than the width of notches 28, 30 and 32 and mounts therewithin. A spring 44 encloses the lower end of stop body 36 below stop arm 38. A spring 46 engages a matching circular recess 47 (FIG. 3), in the base of cylinder segment 22, which is essentially the same diameter as the spring.

Locking means 18 consists of a generally circular metal mounting plate 48, having a circular centered aperture 51 (FIG. 1), through which a locking cylinder enclosure 50 is mounted and secured with nut 52 engaging threads 53. A cam 54 is attached to the end of the lock cylinder proper by means of nut 55 screwed onto the lock cylinder extension. Cam 54 has projections 56 and 57 whose purpose will be described later. A key 58 may be inserted within the key opening and operates the lock cylinder.

Body 14 has a vertical cylindrical shaped aperture 59 which is slightly greater in diameter than the cylindrical segments 20 and 22 on the member 16 and slightly deeper than the combined length of member 16 and spring 46, when spring 46 is compressed and mounted in its recess 47. A vertical rectangular shaped notch 60, having the same width as notches 28, 30 and 32 and a depth of approximately one-quarter that of notches 30 and 32, is provided the full length of aperture 59. A horizontal cylindrical shaped aperture 62, having a diameter slightly less than that of mounting plate 48 of the lock assembly, is provided in body 14 and extends essentially perpendicular to aperture 59 of a depth which is slightly greater than the thickness of the plate 48. A second horizontal cylindrically shaped counter bore 64, coaxial with bore 62 and slightly larger in diameter than nut 52, extends into aperture 59. Body 14 has a generally circular vertical upper lip 65 which is slightly larger than the outer dimensions of the edge of the standard hitch 12 about the ball opening. Lip 65 is extended upwardly typically about ⅜ inch, and is bent horizontally to form a horizontal lip 66 to define a recess adapted to fit about the edge of a trailer hitch.

An arc shaped cut-out 70 is provided in the center of the semi-circle described by lip 66, the purpose of which will be discussed later. Body 14 has a generally circular projection 72 opposite cut-out 70. The upper surface 68 of body 14 is in one horizontal plane, which is perpendicular to aperture 59, with the exception of projection 72 which is bent in a downward direction from said plane. The purpose for this downward projection will be discussed later.

To assemble this locking device, spring 44 is placed over the lower portion of floating stop 34 between stop arm 38 and lower projection 42. Floating stop 34 is then inserted into notches 28, 30 and 32 with stop arm 38 under the upper cylindrical segment 20 and spring 44 above the lower segment 22. Spring 46 is inserted into recess 47, then the entire assembly is inserted into body aperture 59, with floating stop 34 fitted into notch 60. Cut-out 70 provides clearance for floating stop 34. The upper surface of cylinder segment 20 will be in the same plane as the upper surface 68 of the body member when spring 46 is extended. The key operated locking means 18 is then inserted into apertures 62 and 64 with cam projection 56 facing notch 60 and disposed in the notch formed between cylinder segments 20 and 22. Mounting plate 48 is then press fitted into aperture 62 until it bottoms out at the shoulder of counter bore 64.

After assembly, the relationship of the major operating parts of the lock, at various stages of the locking-unlocking cycle are shown in FIGS. 3 through 7. In FIG. 3 the initiation of the locking cycle is shown with locking device 10 being slid rightward over the leftward end of trailer hitch 12, with surface 68 parallel to the bottom edge of the trailer hitch and lips 65 and 66 partially enclosing the extreme leftward end of the lower edge of the hitch. In this position, the semi-circle formed by lips 65 and 66 will enclose a matching semi-circular shaped leftward lower edge of trailer hitch 12. In this position, the bolt 26 is held in its maximum upward position above surface 68 by means of spring 46 bearing against the bottom cylinder segment 22. Cam 54 is located in the broad notch between the segments 20 and 22. Floating stop 34 is held in a maximum upward position relative to member 16 by spring 44 bearing against the top surface of segment 22.

In FIG. 4 locking device 10 has been moved further rightward relative to trailer hitch 12 from the position shown in FIG. 3. The lower left edge of trailer hitch 12 now bears against and presses ramp 27 downward which, in turn, partially compresses spring 46. Floating stop 34 is still held in a maximum upward position relative to member 16 by spring 44 but is carried downward relative to surface 68 by the movement of member 16.

In FIG. 5 lock device 10 is moved a maximum distance rightward relative to trailer hitch 12 where the lower circular edge of the trailer hitch bears against vertical lip 65 on the body 14. In this position, the leftward inner edge of the opening to the ball socket of the trailer hitch 12 has moved clear of bolt 26 whereupon spring 46 has returned member 16 and bolt 26 to a maximum upward position, which is now within the hollow ball receptacle of hitch 12. In this position, however, the bottom edge surface of hitch 12 still bears against the top of floating stop 34. When bolt 26 clears hitch 12 and member 16 is urged upward by spring 46, a projection 31 within notch 30 engages projection 40 on floating stop 34. The resulting forces cause floating stop 34 to rotate or cant in a counter-clockwise direction until the lower end of the stop reaches the bottom of notch 32 in which position projection 42 will engage the bottom of lower cylinder segment 22 within notch 32. It will be recalled that notch 32 is cut deeper than notch 30 which permits this rotation. In this position the lower end of floating stop 34 is only a slight distance from the bottom of aperture 59.

In this fully engaged position, the sloped projection 72 is slightly below and opposite the bolt and nut (not shown) which normally holds the working mechanism of trailer hitch 12 in place on the trailer tongue. Projection 72 thus prevents removal of the nut from the bolt and of the hitch from the tongue. Projection 72 is rounded slightly downward to clear the end of said trailer hitch bolt.

With projection 42 engaged with segment 22 in notch 32, it is impossible to force ramp 27 further downward because floating stop 42 will be forced against the bottom of aperture 59 by cylinder segment 22 bearing against projection 42, thus preventing any substantial downward movement. The sheer side of the ramp or bolt 26 bearing against the interior of trailer hitch 12 will prevent sliding locking device 10 leftward relative to the trailer hitch to remove it. Any attempt to force the bolt 26 below the lower edge of trailer hitch 12 as by prying or jimmying from the outside will be thwarted by this same action. The locking cycle is completed with the working parts in this relationship. No accessory tools of any type have been required to install the locking device.

To remove locking device 10 from trailer hitch 12 the bolt 26 must be moved to a position below the lower edge of trailer hitch 12. This is accomplished by rotating the key operated cam 54 in a counter-clockwise position. Cam 54 is in the position shown in FIG. 5 immediately before the unlocking cycle is initiated.

Figure 6:
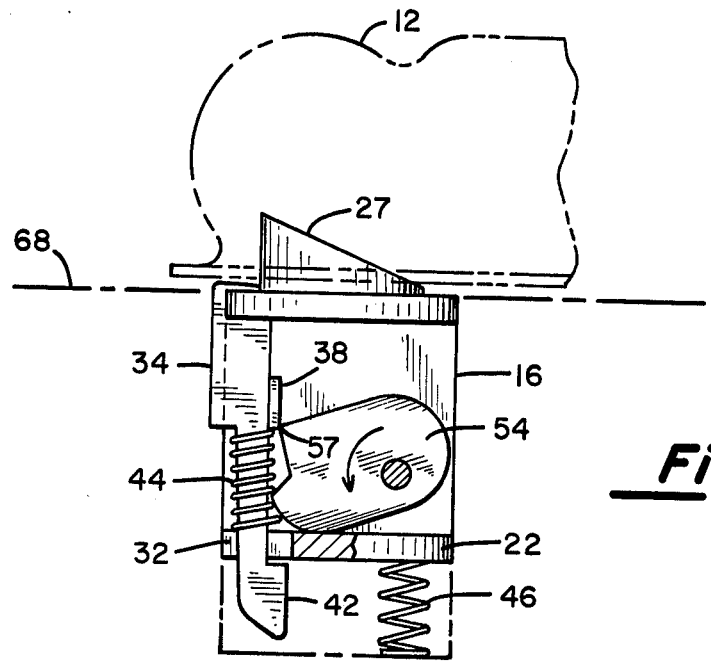

To rotate cam 54 counter-clockwise, key 58 is inserted in the lock cylinder and rotated counter-clockwise which, in turn, rotates the cam as illustrated in FIG. 6. The cam 54 is rotated slightly counter-clockwise and projection 57 has forced stop arm 38 leftward and moved projection 42 within notch 32 clear of the cylinder segment 22.

Figure 7:
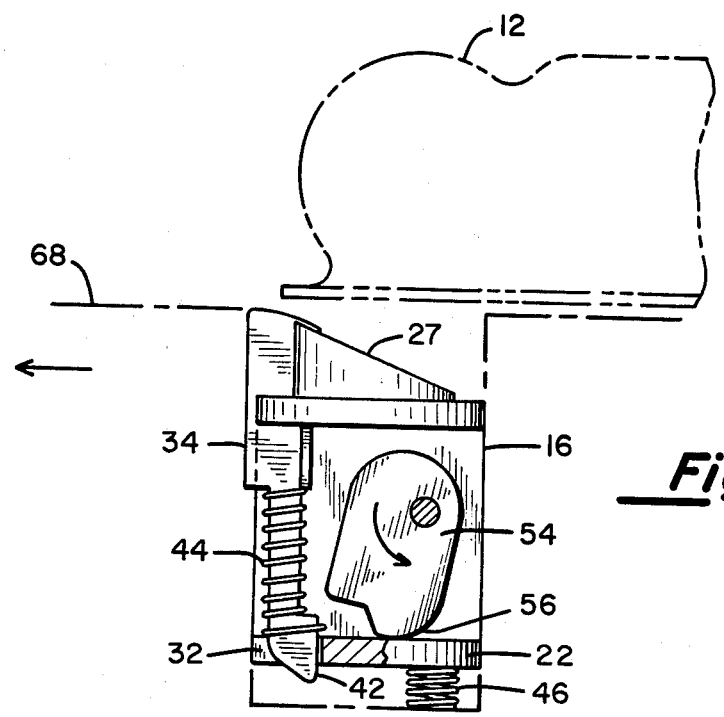

In FIG. 7 cam 54 has been rotated further counter-clockwise by key 58. In this position projection 56 bears against the top surface of cylinder segment 22 forcing it downward and compressing spring 46. Cylinder segment 22 is not restrained in this motion by projection 42 because cam 54 held projection 42 leftward until it was within notch 32. With cylinder segment 22 in this position, member 16 carries both bolt 28 and floating stop 34 below the level of horizontal surface 68. With floating stop 34 and ramp 27 below surface 68, locking device 10 can be moved leftward, free of the trailer hitch 12 as illustrated. After the locking device 10 has been moved clear of trailer hitch 12, the force of spring 46 can be removed. Spring 46 will then move member 16 and cam 54 to their original positions as shown in FIG. 3 where a new locking cycle can be originated.

This trailer hitch lock provides an anti-theft device which is simple to install in that the device has only to be slid over the bottom edge of the trailer hitch to be locked in place. Once in place the floating stop prevents forcing the bolt clear of the trailer hitch, unless enough force can be exerted to actually break the stop, which provides great security but which can readily be removed by using only a key.

This trailer hitch lock provides a rugged locking action which is simple to attach and remove with no tools other than a key and which requires no adjustment whatsoever.

Although specific instruction of the herein disclosed lock has been shown and described, it is obvious that those skilled in the art may make various modifications and changes to them without departing from the scope and spirit of the present invention. It is to be expressly understood that the instant invention is limited only by the appended claims.

What is claimed is:

1. An anti-theft device for a trailer having a ball hitch of the type comprising a generally spherical socket member having an opening for receiving a ball member and a flange extending outwardly and surrounding said opening, said device comprising:
   (a) a body member having a generally planar surface and surrounded on three sides by a U-shaped recess adapted to slidingly engage said flange on said socket member, a first bore extending normal to said planar surface and a predetermined distance into said body member, and a transversely extending second bore intersecting with said first bore;
   (b) a spring loaded bolt member having a ramp surface formed on an end segment thereof disposed in said first bore with said ramp surface extending above said planar surface and into said opening of said socket member when said U-shaped recess engages said flange and when said spring is extended and retractable within said bore and below said planar surface when said spring is compressed;
   (c) a floating stop member disposed in said first bore for allowing depression of said ramp surface below said planar surface when in a first orientation and for preventing said depression when in a second orientation; and
   (d) a key operated cam element disposed in said second bore, said cam element cooperating with said floating stop member to move said stop member to said first orientation.

2. The devices as in claim 1 wherein said bolt member comprises a generally cylindrical element having a recess formed in a side surface thereof defining first and second cylindrical segments, said ramp surface being formed on an upper exposed surface of said first segment, each of said first and second segments and said ramp surface having aligned notches extending inwardly and generally parallel to a wall formed at the base of said recess in said side surface of said cylindrical element, said floating stop member being disposed in said aligned notches.

3. Apparatus as in claim 2 wherein said floating stop member includes first and second spaced apart projections for engaging said cylindrical segments proximate said aligned notches and the bottom of said first bore when said stop member is in said second orientation.

4. The device as in claim 3 wherein said kep operated cam, when rotated by turning the key, initially displaces said first projection from engagement with said second cylindrical segment and upon continued rotation, retracts said ramp surface below said planar surface.

* * * * *